US012755607B2

(12) United States Patent
Keilwert et al.

(10) Patent No.: US 12,755,607 B2
(45) Date of Patent: Oct. 6, 2026

(54) SLOT GAME TOKENIZATION

(71) Applicant: IGT, Las Vegas, NV (US)

(72) Inventors: Stefan Keilwert, St. Josef (AT); Soheil Latifi, Brampton (CA); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 263 days.

(21) Appl. No.: 18/606,831

(22) Filed: Mar. 15, 2024

(65) Prior Publication Data

US 2025/0292653 A1 Sep. 18, 2025

(51) Int. Cl.
*G07F 17/32* (2006.01)
*G06Q 40/04* (2012.01)

(52) U.S. Cl.
CPC ......... *G07F 17/3248* (2013.01); *G06Q 40/04* (2013.01); *G06Q 2220/00* (2013.01)

(58) Field of Classification Search
CPC . G07F 17/3248; G06Q 40/04; G06Q 2220/00
See application file for complete search history.

(56) References Cited

U.S. PATENT DOCUMENTS 8,607,067 B1 * 12/2013 Janse Van Rensburg .................. H04L 63/20 713/189
11,792,026 B2 * 10/2023 Nelson .................. H04L 9/3236 463/25
11,830,309 B2 * 11/2023 Nelson ................ G07F 17/3244
12,148,264 B2 * 11/2024 Higgins .............. G07F 17/3223
2020/0042988 A1 * 2/2020 Snow .................... G06Q 20/381
2023/0385965 A1 * 11/2023 Jacobson ............. G06Q 20/389
2023/0410126 A1 * 12/2023 Yeung .................. G06Q 30/018
2025/0078621 A1 * 3/2025 Alvarez .............. G07F 17/3237
2025/0078622 A1 * 3/2025 Van Niekerk ....... G07F 17/3267
2025/0371939 A1 * 12/2025 Van Niekerk ....... G07F 17/3244
2025/0371940 A1 * 12/2025 Alvarez .............. G07F 17/3251
2025/0371941 A1 * 12/2025 Van Niekerk ......... G07F 17/326

FOREIGN PATENT DOCUMENTS

WO WO-2021209837 A1 * 10/2021 ........... G06F 21/604

* cited by examiner

*Primary Examiner* — Tramar Harper
(74) *Attorney, Agent, or Firm* — Spencer Fane LLP; William M. Kelly

(57) ABSTRACT

Methods, systems, and devices are provided herein. A method includes providing, by a processor circuit, a primary wagering game at a physical gaming asset to a first player, dividing, by the processor circuit, a value of the physical gaming asset, into multiple cryptographic tokens that each correspond to an ownership share of the physical gaming asset, and transferring one of the cryptographic tokens to the first player via a blockchain. Methods further include determining gaming revenue that is generated by the physical gaming asset, determining a share portion of the gaming revenue based on a quantity of cryptographic tokens and the shared portion of the gaming revenue, and automatically transferring the share portion of the gaming revenue to the first user.

20 Claims, 10 Drawing Sheets

SLOT GAME TOKENIZATION

BACKGROUND

Embodiments described herein relate to interactions with wagering games. Some wagering games, such as slot games and/or video poker games provided at Electronic Gaming Machines (EGMs) and/or mechanical gaming devices in a casino environment, may include unique game features as an additional incentive for play of a wagering game. Such unique game features for playing a wagering game other than merely playing a base game. For example, a user may interact with the wagering game by enabling a secondary wagering game in a gaming environment, such as in a casino environment, and related devices, systems, and methods. However, there is a need for providing additional options for extracting additional revenue from slot games.

BRIEF SUMMARY

According to some embodiments, a system includes a processor circuit and a memory coupled to the processor circuit. The memory comprises machine readable instructions that, when executed by the processor circuit, cause the processor circuit to divide a value of a physical gaming asset into multiple cryptographic tokens that represent an ownership share of the physical gaming asset. The processor circuit may transfer ownership of one of the cryptographic tokens to a first player and transfer revenue value that corresponds to revenue that is generated by the physical gaming asset and the one or more cryptographic tokens.

According to some embodiments, a gaming device includes a display device, a processor circuit, and a memory coupled to the processor circuit. The memory includes machine-readable instructions that, when executed by the processor circuit, cause the processor circuit to divide a value of a physical gaming asset into multiple cryptographic tokens that each represent an ownership share of the physical gaming asset. The processor circuit is further caused to determine that a user is eligible to own one of the cryptographic tokens and to transfer, for value, one of the cryptographic tokens to the user via a decentralized and distributed digital ledger that includes blocks. The processor circuit is further caused to automatically determine a revenue amount that is generated by the physical gaming asset and to determine a revenue value that corresponds to the revenue amount and a quantity of the of cryptographic tokens owned by the user. The processor circuit is further caused to transfer the revenue value to the user.

According to some embodiments, a method includes operations for providing wagering game tokenization of a physical wagering asset according to some embodiments. Methods may include providing, by a processor circuit, a primary wagering game at a physical gaming asset to a first player and dividing, by the processor circuit, a value of the physical gaming asset into multiple cryptographic tokens that each correspond to an ownership share of the physical gaming asset. Operations include transferring one of the cryptographic tokens to the first player via a blockchain and determining (gaming revenue that is generated by the physical gaming asset. Operations may include determining a share portion of the gaming revenue based on a quantity of cryptographic tokens and the shared portion of the gaming revenue and automatically transferring the share portion of the gaming revenue to the first user.

DETAILED DESCRIPTION

Figure 1:
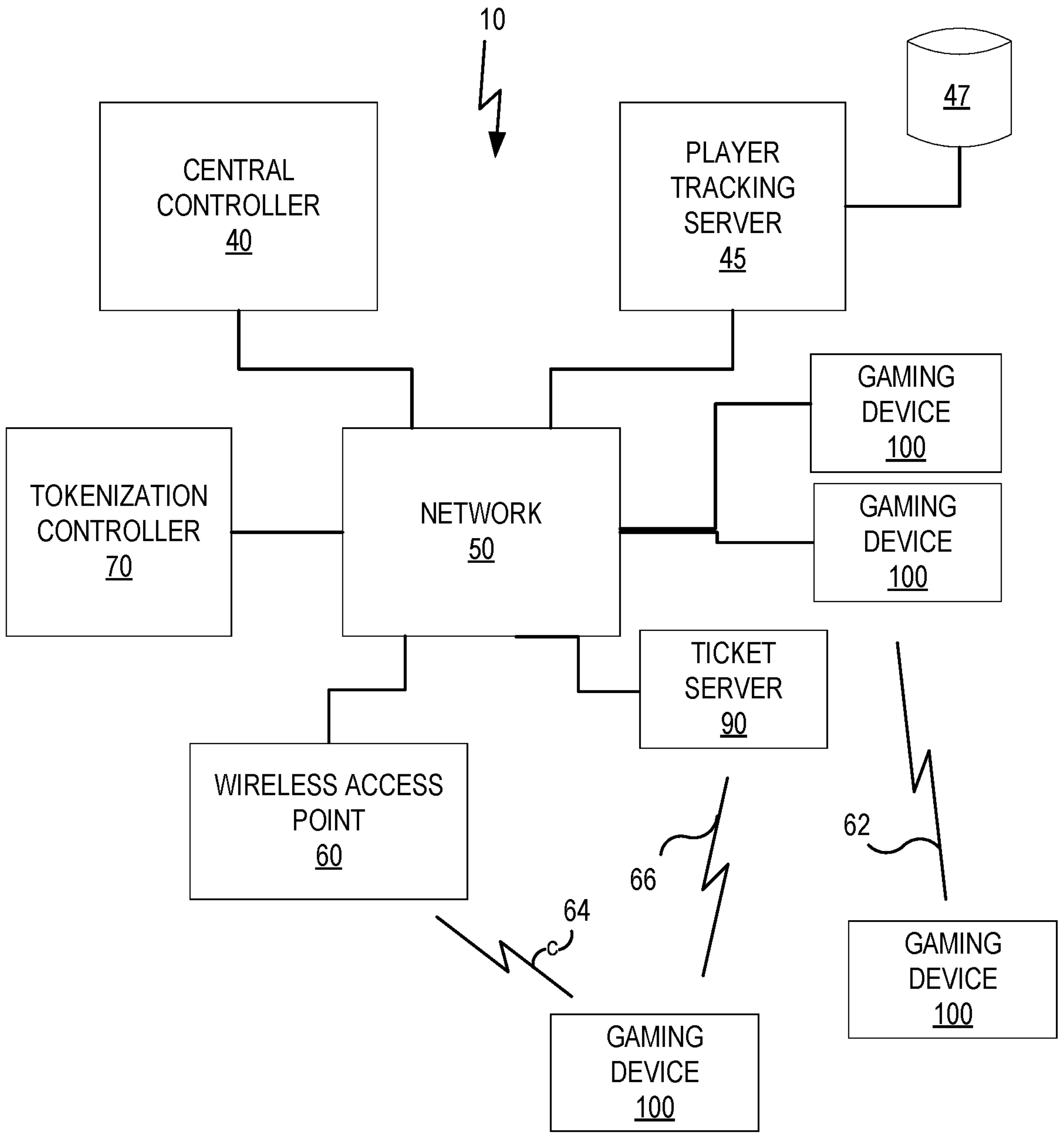
FIG. 1 is a schematic block diagram illustrating a network configuration for a plurality of gaming devices according to some embodiments.

In some embodiments, cryptographic tokens may be redeemable as game features or side games for a wagering game. For example, the game features may be accessed as part of a play session at a dedicated gaming device, e.g., an EGM, sports betting kiosk, etc., or may be accessed in an independent gaming environment, such as a mobile phone, tablet, or other player device.

In some embodiments, cryptographic token-based game content can be provided in a flexible and cost-effective manner, and in a way that does not require modification of existing games. In many jurisdictions, when games are modified, they need to be re-submitted for regulatory certification, which represents an additional cost. At the same time, however, it is desirable for the player's experience to be as seamless and coordinated as possible.

In some embodiments, blockchain technology may be used to tokenize one or more wagering games. For example, any or all of a slot game, slot game themes, slot machine cabinets, and/or groups of games, cabinets and/or combination thereof. Some embodiments provide that the wagering games may further include online, land-based and/or lottery games, among others.

As provided above, a wagering game, such as a slot game, may be split into a defined number of tokens. For example, the wagering game may be split into 1000 tokens. In some embodiments, each token may represent an ownership share of the wagering game. In some embodiments, the tokens may be purchased by a player, a spectator, an interested party, and/or a legal entity, among others. Based on ownership of the token, revenue may be created for the token owner. Additionally, the revenue received from selling the token may be revenue for the wagering game owner.

In some embodiments, a token may be awarded to a player during play of the game either by a player or non-player in-game. In this manner, the player may be incentivized to play the wagering game more frequently and/or more aggressively. In some embodiments, a token owner may be entitled to earn revenue from the game and/or may trade tokens they own.

In some embodiments, all token related activities may be tracked in a blockchain. In some embodiments, tokens of all available games may be offered on a blockchain and/or cryptographic token trading platform. Trading a token may cost a fee that may create revenue for the owner, operator and/or the wagering machine IGT.

In some embodiments, users may be able to build a portfolio of tokens that correspond to wagering machines according to their preference. For a token portfolio may include two tokens corresponding to a first game that is a specific wagering game in a specific casino in given state. In some embodiments, the first games are in a specific casino that is online. The portfolio may further include 3 tokens corresponding to a second wagering game that is in a specific casino in another physical jurisdiction. Still further, the portfolio may include 5 tokens corresponding to a third game in yet another location. According to embodiments herein, the multiple tokens in the portfolio may create a revenue stream for players.

According to embodiments herein, a blockchain product may be developed in the gaming industry that provides a tokenization mechanism for wagering game owners and/or operators to create a trading platform and to create a new revenue stream for the owner and/or operator. In some embodiments, the price of the tokens may be subject to supply and demand market forces.

Embodiments herein may provide an asset that may maintain growth even during challenging financial and/or economic conditions. For example, players' interests in wagering machines (e.g., EGM's), may rise when inflation is increased and/or employment rate drops. A result of this may be that wagering machine revenue may be a suitable asset for challenging financial and/or economic conditions.

In some embodiments, symbols and/or groups thereof may include unlockable, skins, themes, and/or retro games, among others. Some embodiments may include eligibility criteria to be satisfied before the player is eligible to receive a token. In some embodiments, the eligibility criteria may correspond to the first or initial token. Some embodiments provide that the eligibility criteria may correspond to tokens that may be available after a first token is received.

Some embodiments provide that, upon a wagering game release, a given quantity of tokens may become available for purchase. As disclosed herein, the non-limiting quantity of tokens may be 100 or less, 1000 or less or more than 1000. Upon the game release, the tokens may be issued and available for purchase. Some embodiments provide that only the first 1000 players who trigger a jackpot or other high win in the game may be eligible to purchase a token. In this manner, the tokens may even be more valuable to players by creating an additional appetite to play the game quickly after its release and, possibly, to win big. In some embodiments, additional revenue for the operator and/or owner may be available in the wagering game is a participation-based game. In some embodiments, hitting such a win multiple times (say X times) within the first 1000 plays may make the same player eligible to purchase multiple tokens. For example, up to X tokens may be available to a player that hits the win X times.

Some embodiments provide that, instead of triggering a jackpot/big win within the first 1000 players, criteria such as: play X games/bet a total of X dollars/play every bonus provided within the game, among others.

In some embodiments, a token may correspond to multiple wagering games. For example, the token may be for multi-game machines, games in a series of multiple related machines, and/or games in a series corresponding to a theme.

In some embodiments, in a series of games (e.g., Egyptian games Spring 2023) the player might be required to fulfill a task that involves multiple ones of or all of the games in the series to make the player eligible to purchase the Egyptian participation token.

The token obtained therewith, may be a separate token for each of the games or one overall token for the entire series. For example, a player could earn based on the participation-shares of the whole series of games with one token.

In some embodiments, the quantity of tokens might be limited initially (e.g., 1000 at launch) and, after some time, e.g., every X months, new tokens may be minted and made purchasable to new and/or existing players. In some embodiments, this may make games very attractive at the beginning since participating owners may participate in relatively significant portions of the revenue created by the game initially. Over time, additional players can purchase newly minted tokens. Thus, the participation per token may be decreased as the number of available tokens rises. In some embodiments, the players may become motivated to: play for new tokens to keep their share. Some embodiments provide that the player may be motivated to keep playing and just buy a single token. In this manner, the player may continue to earning money through the token for the lifetime of the token.

In some embodiments, a token may have an unlimited lifetime while some embodiments provide that a token lifetime may be predetermined. In some embodiments, performance of the token may determine when a token expires. For example, responsive to the revenue stream of a token declining to be below a given threshold, the token may be terminated. In some embodiments, the player may provide additional payments to renew and/or restore a token.

A player that owns a previous token series may be granted the chance to get an airdrop for a new token series. In some embodiments, an owner of the first series may be required to fulfill a certain task to become eligible for an airdrop. An example task may include to play the game in the time period between X and Y. Some embodiments provide that token owner rights do not necessarily mean revenue participation. In some embodiments, the token may grant the owner other and/or additional benefits.

Some embodiments provide that token owners of a specific game may be provided with trinkets or other physical items related to the game's theme. In some embodiments, token owners of a specific theme, game, and/or casino location may get free entrance and/or access to events related to the specific theme, game, and/or casino location. In some embodiments such access may include a club membership experience. In some embodiments, token ownership may grant access to a specific game feature, game appearance, visual style and/or bonus feature that other players without a token would not be granted.

In some embodiments, a token may be divisible into fractionalized multiple portions of the token. For example, multiple sub-tokens may each have a value that, in aggregate, has the same value as the token. Much like the token may have a fractional value of the wagering machine, the value of a fractionalized token may have may be even less than the token value. In this manner, an investment in the revenue stream of the wagering machine may require an even lower level of investment to participate.

Some embodiments provide that different tokens corresponding to the same wagering machine and/or group of wagering machines may each have different values and/or rights. For example, first tokens may include a first token type having first rights and a second token type having second rights that are different from the first token rights. In some embodiments, the tokens may include multiple tiers of token value. For example, three-tiers may include gold, silver, and bronze. Some embodiments provide that a lower value (e.g., bronze) token may be combined with other value to trade up for a silver token or a gold token. In some embodiments, multiple lower value tokens may be traded for a single token having a higher value (e.g., two bronzes for one silver or four bronzes for one gold).

In some embodiments, there may be classes of tokens that have different rights and/or costs and that may be traded for one another based on the different rights and/or costs.

In some examples, token-based content may qualify a player for a progressive pot and/or an additional jackpot level. In some examples, a portion of a jackpot may include a token or may be used to purchase a token. One advantage of this arrangement may be a reduction in tax liability depending on local laws and/or regulations, while still providing an award with real and/or perceived value. Tokens may be usable one or multiple times, as desired. For example, a token can be added to a prize pool for a bonus game, and if the token is selected in the game, the total award may be increased or enhanced. In some examples, a token-based feature may be used to provide an advantage or enhancement during a bonus game, such as unlocking additional bonus symbols, reels, or other features, and/or increasing or enhancing a bonus win, e.g., applying a multiplier.

In some examples, a token may qualify a player for a bonus or other enhancement. For example, in a progressive game that normally requires the player to wager a maximum amount to qualify for the jackpot, a token may unlock the ability to wager a lower amount and still qualify for the jackpot. In some examples, as a token increases in value and/or status over time and/or based on the player's play or spending, the bet threshold may be lowered further.

In some examples, a secondary game may be made available to play that is completely funded and paid out with tokens, such as a side game that is played within or in tandem with another game (e.g., side by side with the base game), which may in turn increase player loyalty and engagement. In some examples, a token or token-based feature may unlock special pay categories, such as enhanced pay tables, additional themes, games, or skins of games in a multigame suite, classic or rare games, and/or special suite of exclusive games.

As provided herein improvements to providing engagement between wagering machine and players may include allowing the player to participate in a revenue stream of the wagering game without actually playing the underlying game and a revenue from the player that purchases cryptographic tokens.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
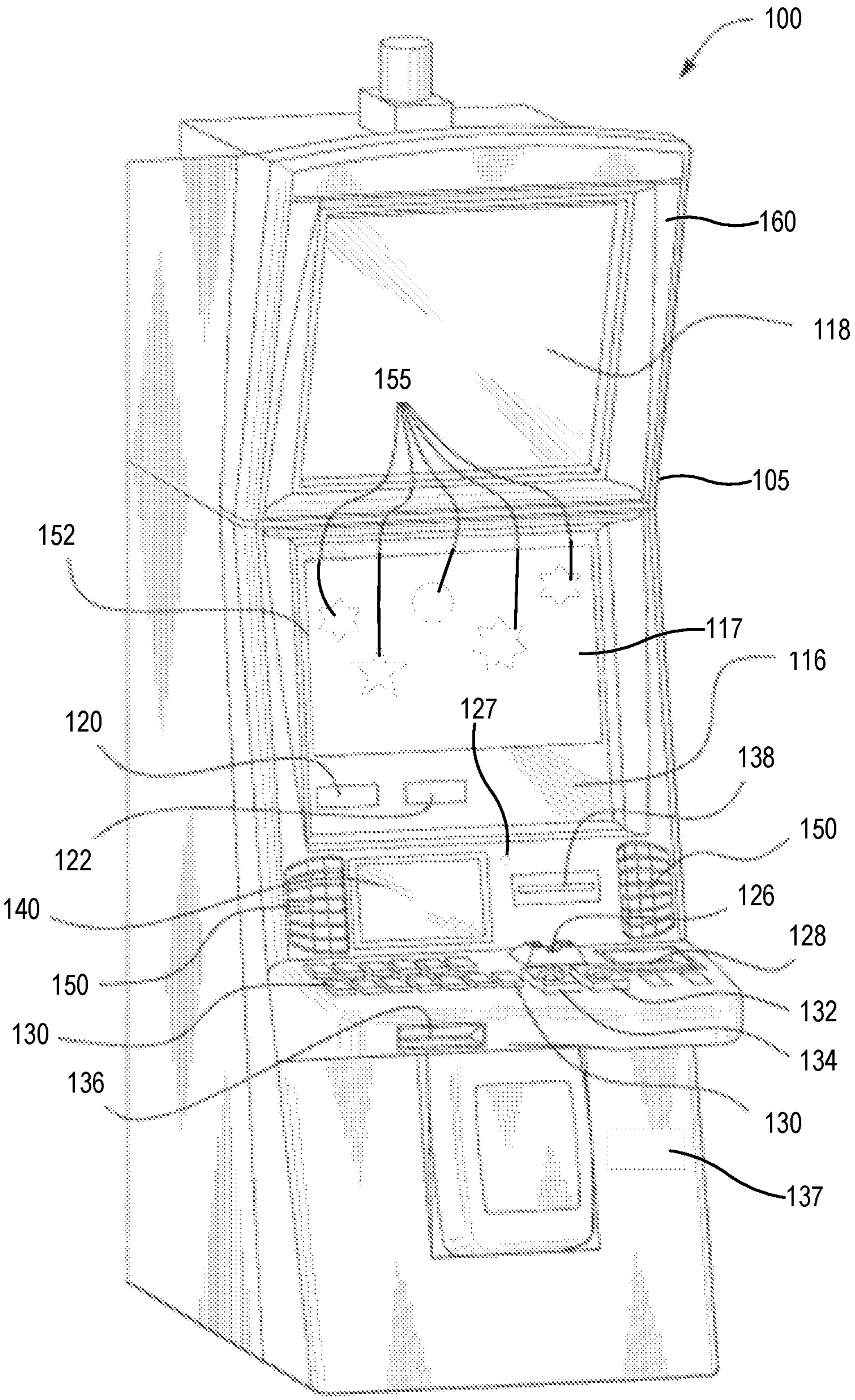
FIG. 2A is a perspective view of a gaming device that can be configured according to some embodiments.
Figure 2B:
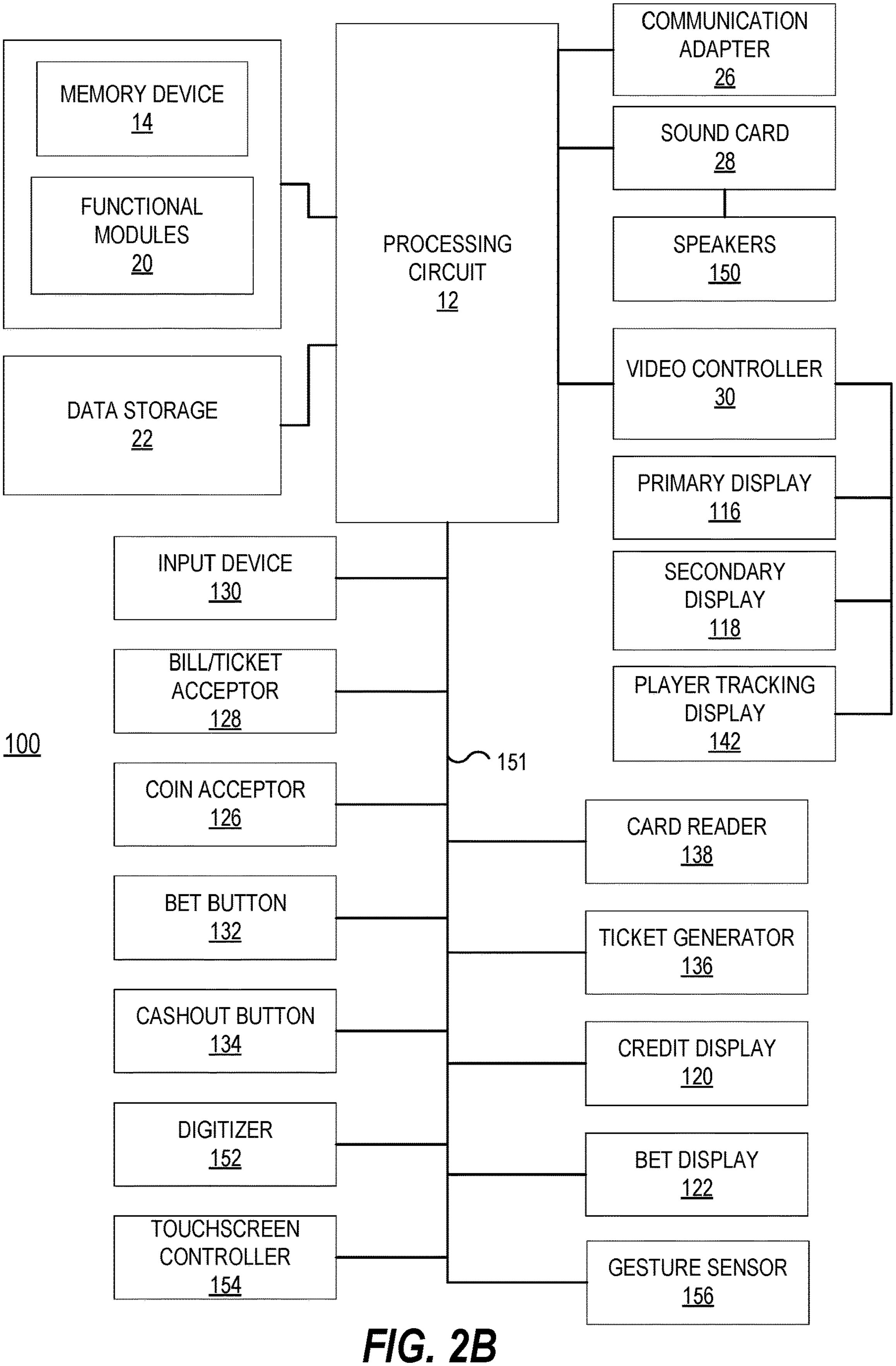
FIG. 2B is a schematic block diagram illustrating an electronic configuration for a gaming device according to some embodiments.
Figure 2C:
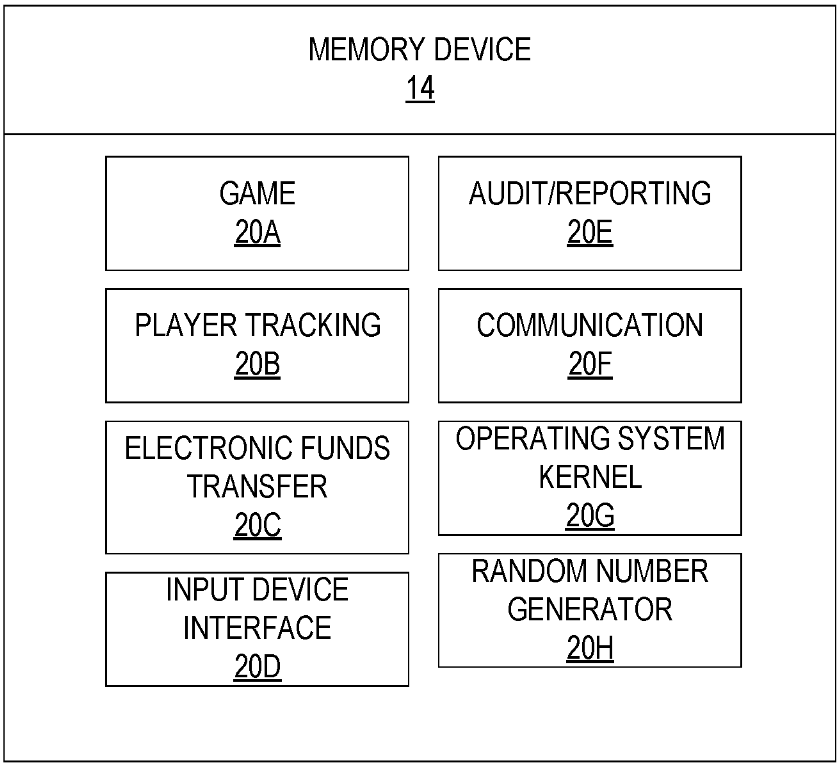
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

In some embodiments, the gaming system 10 includes a tokenization controller 70. The tokenization controller 70 may be a computing system that communicates through the data communication network 50 with the ticket server 90 and the AR device 200 and/or VR device 201 to coordinate the tokenization of a physical wagering machine into cryptographic tokens that each represent an ownership share of a revenue stream of the physical wagering machine. The tokenization controller 70 may be implemented within or separately from the central controller 40.

In some embodiments, the tokenization controller 70 may coordinate the buying, selling and/or trading of cryptographic tokens that correspond to physical wagering games. In some embodiments, the tokenization controller may include a blockchain that is operable to receive, transmit and/or store data corresponding to the cryptographic tokens. Some embodiments provide that the blockchain is external to the tokenization controller 70 and communicates with the blockchain to maintain data corresponding to cryptographic tokens therein.

Moreover, in some embodiments, the tokenization controller 70 may coordinate one or more releases of sets of cryptographic tokens that may include the same terms as previous releases and/or may include tokens having different rights and/or terms.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
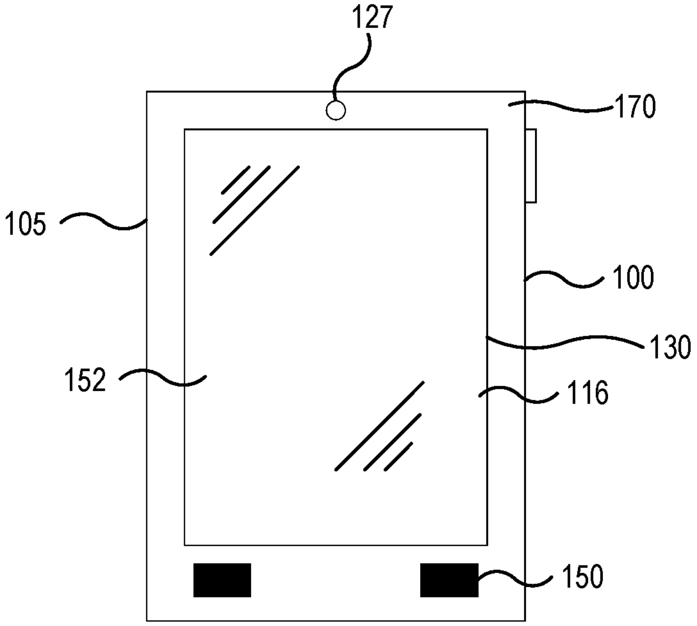
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
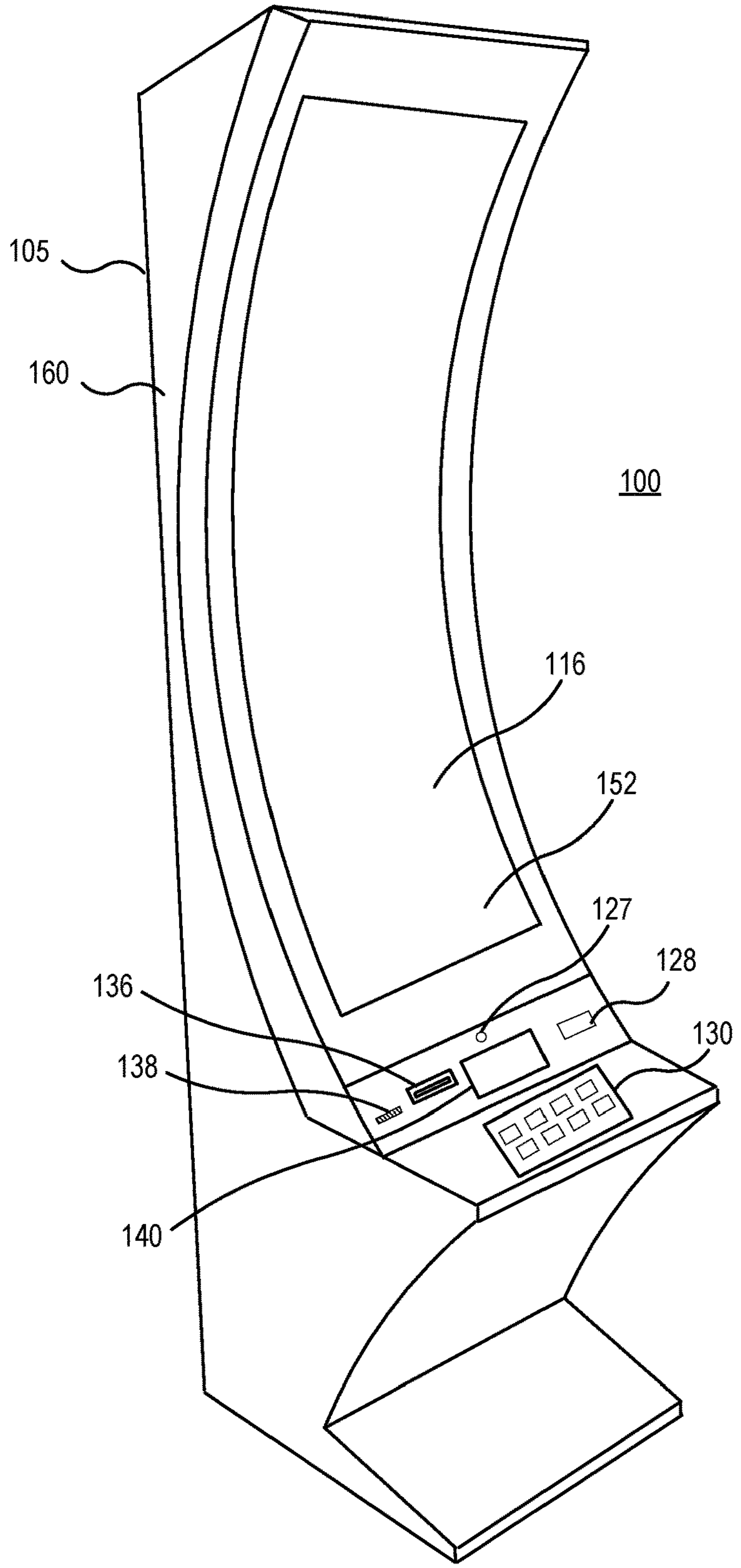
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
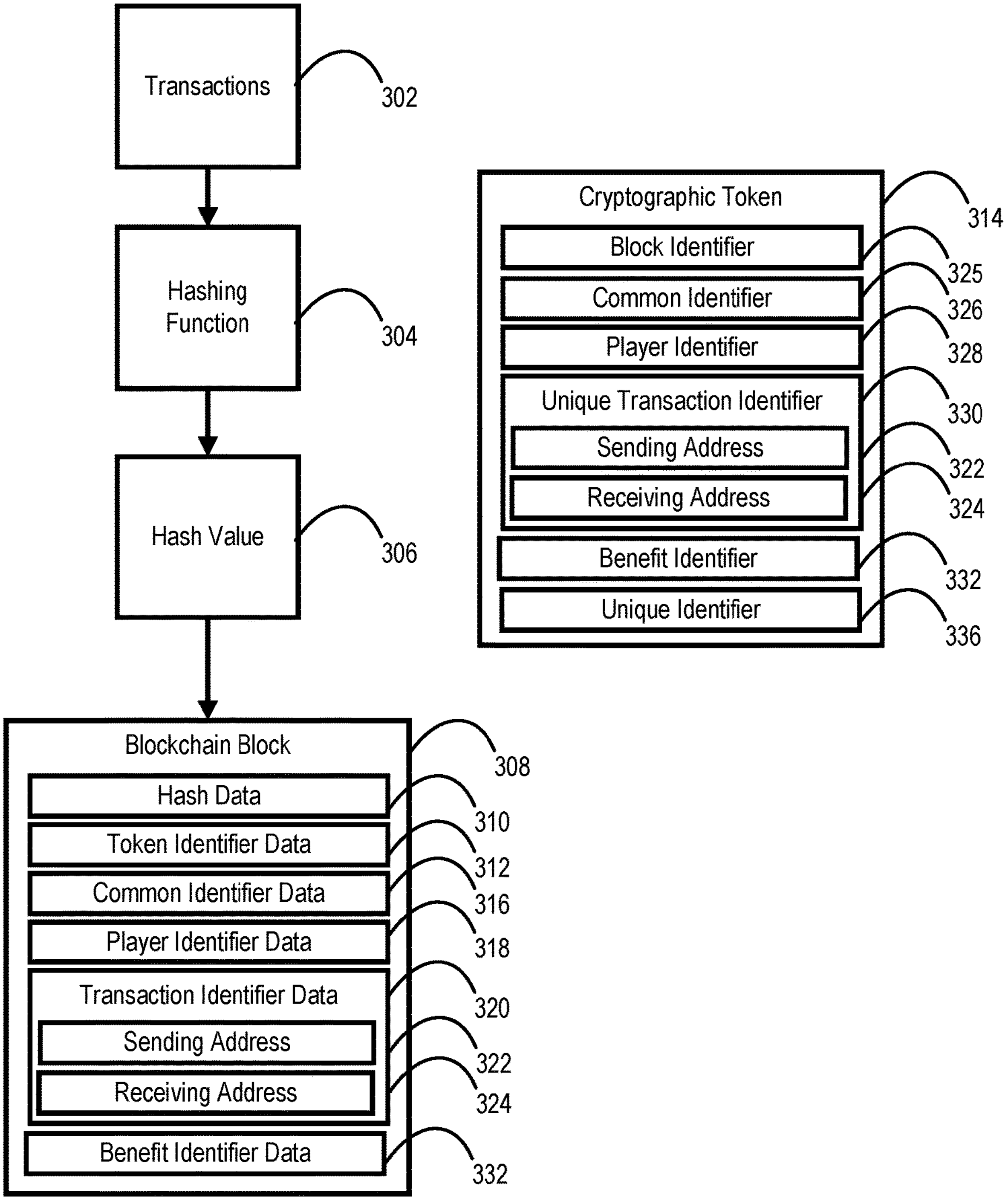
FIG. 3 is a schematic block diagram illustrating various operations for a blockchain token transaction according to some embodiments.

Referring now to FIG. 3, a schematic block diagram illustrates various operations for a blockchain transaction recordation according to some embodiments. As illustrated in FIG. 3, transactions 302 may occur at various blockchain nodes. In accordance with various embodiments, a hash may be created for each entry. For example, a cryptographic hash function may create a one-way, (essentially) collision free signature of the entry. The hash algorithm generates a hash. Using hashing function 304, hash values 306 of these transactions are created and added to blockchain blocks 308 that are in the blockchain data structure.

In this example, each blockchain block 308 may include one or more different types of data. For example, each blockchain block 308 may include cryptographic hash data 310 indicative of a result of the hashing function 304 associated with a common blockchain, token identifier data 312 indicative of an identity of a cryptographic token 314 associated with the block 308, common identifier data 316 indicative of the cryptographic token 314 being part of a plurality of cryptographic tokens, e.g., a defined subset of tokens based on different criteria, associated with the common blockchain, player identifier data 318 indicative of an identity of a player associated with the cryptographic token 314, transaction identifier data 320 associated with the unique transaction on the blockchain, which may include a sending address 322 associated with a provider of the cryptographic token 314 and a receiving address 324 associated with the player identifier data 318.

The cryptographic token 314 may include some or all of the data structure of the respective associated block 308 and/or may contain a block identifier 325 referring to the associated block 308, which allows the cryptographic token 314 to be securely and transparently authenticated against the blockchain. In some examples, the cryptographic token 314 may include a common identifier 326 corresponding to the common identifier data 316 and indicative of the cryptographic token 314 being part of the plurality of cryptographic tokens, and a player identifier 328 corresponding to the player identifier data 318 and indicative of a player associated with the cryptographic token 314. The cryptographic token 314 may include a unique transaction identifier 330 associated with a unique transaction on the blockchain, i.e., a unique block 308, and may include the sending address 322 and/or the receiving address 324.

For example, a new transaction for the cryptographic token may include transmitting a transaction indication of the new transaction including a sending address 322 and receiving address 324, and, based on the transaction indication, modifying the player identifier data 318 in a new block 308 and/or the player identifier 328 of the cryptographic token 314 to be indicative of a different player.

In some examples, each block 308 may further include benefit identifier data 332 associated with a game benefit being provided to the player associated with the cryptographic token 314. Alternatively, or in addition, the cryptographic token 314 may include a benefit identifier 334 corresponding to the benefit and/or benefit identifier data 332. Each cryptographic token 314 may be a fungible token that is fungible with other cryptographic tokens, and/or may further include a unique identifier 336, which may correspond to the token identifier data 312 of the block 308, such that the cryptographic token 314 is a non-fungible token that is not fungible with other cryptographic tokens.

As a general principle, a validation process may be performed to ensure that each new blockchain block 308 meets the criteria for inclusion into the blockchain data structure. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (POS) consensus algorithm, which may be used as the value of an underlying data block and/or value changes.

Figure 4:
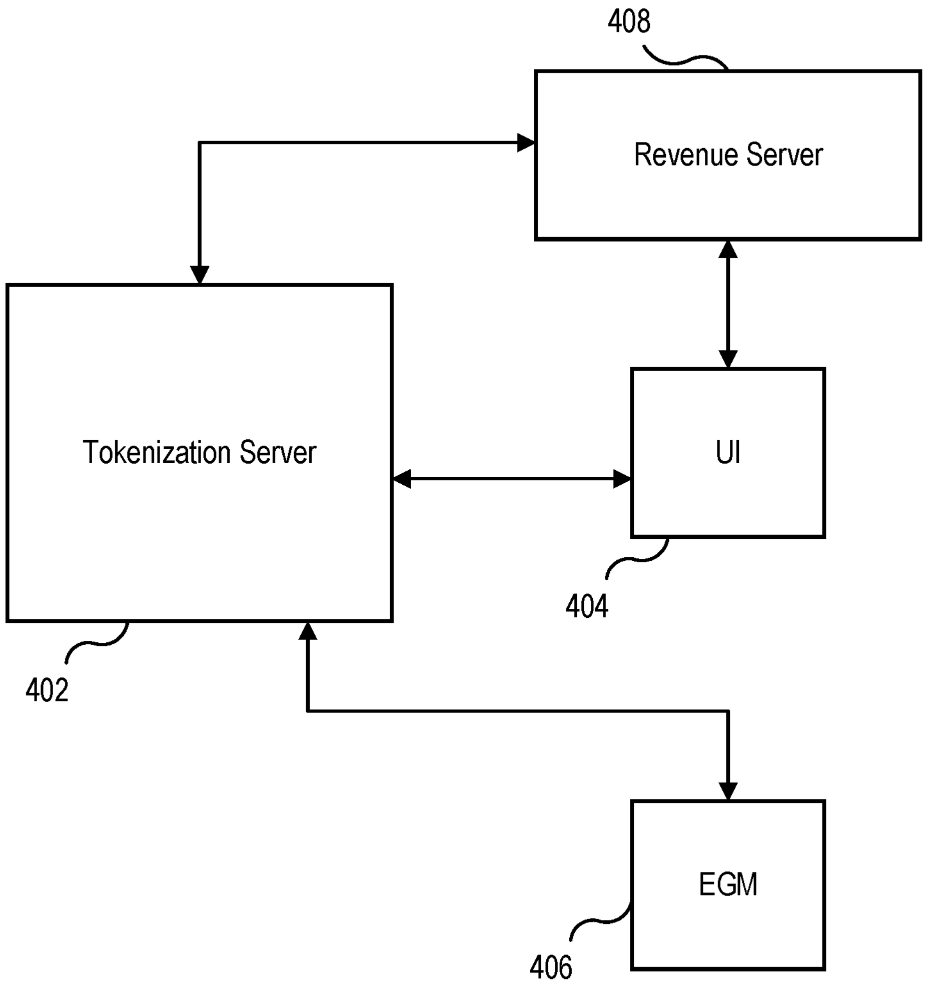
FIG. 4 is a schematic block diagram illustrating systems, apparatus and operations for wagering game tokenization according to some embodiments.

Reference is now made to FIG. 4, which is a schematic block diagram illustrating systems, apparatus and operations for wagering game tokenization according to some embodiments. Some embodiments include a tokenization server 402 that is operable to divide a value of an EGM 406. In some embodiments, the EGM 406 may include any type of physical wagering devices and/or groups of physical wagering devices that provide a revenue stream. In some embodiments, the multiple cryptographic tokens may each represent an ownership share of a revenue string corresponding to the physical wagering device. In some embodiments, the tokenization server 402 includes and/or is in communication with a blockchain that is operable to manage the ownership of the cryptographic tokens.

In some embodiments, a revenue server 408 may determine a revenue value that corresponds to the ownership of the of the cryptographic token and the financial performance of the physical wagering machine. In some embodiments, the revenue server 408 may also determine a per token value for buying, selling and/or trading the cryptographic token.

A user interface (UI) 404 is operable to receive inputs from the tokenization server 402. For example, data flow between the tokenization server 402 and the UI 404 may be associated with transactions corresponding to the cryptographic token purchases, sales and trades, among others. The UI 404 may be operable to exchange data with the revenue server 408. For example, the UI 404 may provide information regarding the disposition of revenue generated based on input received by a player via the UI 404.

Figure 5:
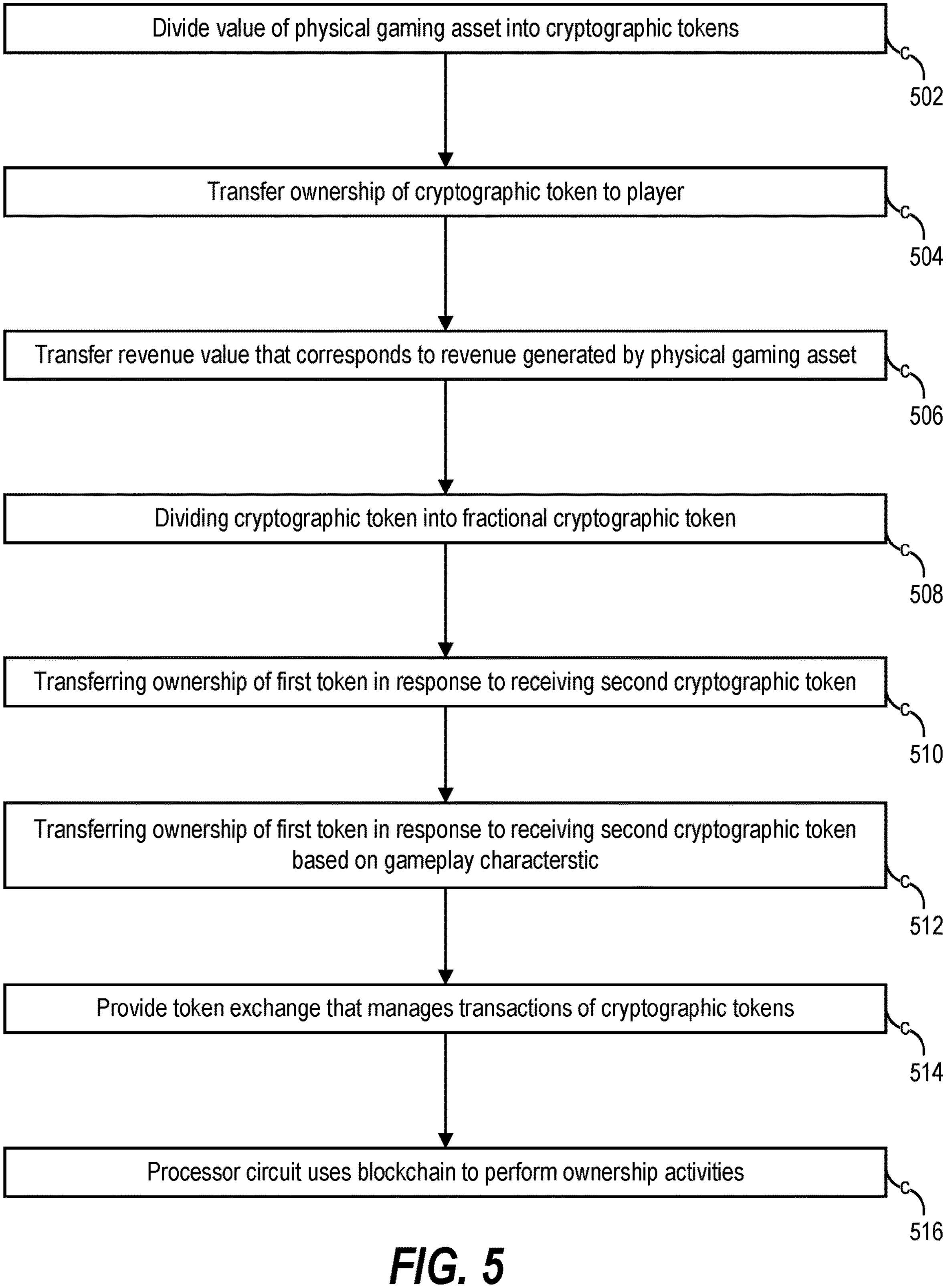
FIG. 5 is a flowchart illustrating operations of systems/devices/methods for providing wagering game tokenization of a physical wagering asset according to some embodiments.

Brief reference is now made to FIG. 5, which is a flowchart illustrating operations of systems/methods for providing wagering game tokenization of a physical wagering asset according to some embodiments. A system according to some embodiments may include a processor circuit and a memory coupled to the processor circuit, the memory comprising machine-readable instructions that, when executed by the processor circuit, cause the processor circuit to divide (block 502) a value of a physical gaming asset into multiple cryptographic tokens that represent an ownership share of the physical gaming asset. The processor circuit may transfer (block 504) ownership of one of the cryptographic tokens to a first player and transfer (block 506) revenue value that corresponds to revenue that is generated by the physical gaming asset and the one or more cryptographic tokens.

In some embodiments, the physical gaming asset is an electronic gaming machine (EGM) and the value of the physical gaming asset corresponds to revenue that is generated by the EGM. In some embodiments, the physical gaming asset includes a single instance of a specific physical gaming asset.

Some embodiments provide that the physical gaming asset includes multiple instances of the same physical gaming asset. For example, some of the instances are in different casinos from one another. In some embodiments, the physical gaming asset includes multiple different EGMs and/or types thereof. In some embodiments, the physical gaming asset includes an online gaming system while in some other games the physical gaming asset includes a lottery game.

In some embodiments, transferring ownership of one of the cryptographic tokens to the first player includes dividing (block 508) one of the cryptographic tokens into a fractional cryptographic token that corresponds to less than a full ownership share of one of the plurality of cryptographic tokens.

In some embodiments, the cryptographic tokens include a first portion of first cryptographic tokens having a first value, a second portion of second cryptographic tokens having a second value and a third portion of third cryptographic tokens having a third value. In such embodiments the first value is greater than the second value and the third value. In some embodiments, the second value is greater than the third value.

In some embodiments, transferring ownership of one of the cryptographic tokens to the first player includes transferring (block 510) ownership of one of the first cryptographic tokens to the first player in response to receiving ownership of one of the second cryptographic tokens or the third cryptographic tokens and a non-cryptographic value.

In some embodiments, transferring ownership of one of the cryptographic tokens to the first player includes transferring (block 512) ownership of one of the first cryptographic tokens to the first player in response to receiving ownership of one of the second cryptographic tokens or the third cryptographic tokens and based on game play characteristic of the first player.

In some embodiments, the processor circuit is further caused to provide (block 514) a token exchange that manages transactions of cryptographic tokens. Some embodiments provide that the value of the physical gaming asset is based on a demand for the physical gaming asset.

In some embodiments, a eligibility of the first player to buy the one of the cryptographic tokens is based on a player interaction with the physical gaming asset. For example, player game play interaction may include threshold frequency, quantity and/or total wager activity to be eligible to buy a cryptographic token.

In some embodiments, the player interaction with the physical gaming asset includes a wager amount of the first player on the physical gaming asset. Some embodiments provide player interaction with the physical gaming asset by earning bonuses during a wagering session.

In some embodiments, the cryptographic tokens include a first portion of first cryptographic tokens that correspond to a primary game at the physical gaming asset and a second portion of second cryptographic tokens that correspond to a secondary game at the physical gaming asset that is different from the primary game. In some embodiments, the first cryptographic tokens are available to the first player based on primary game performance. In some embodiments, the second cryptographic tokens are available to the first player based on secondary game performance. In some embodiments, the secondary game includes a bonus game.

In some embodiments, the processor circuit is further caused to use (block 516) a blockchain to perform ownership activities that include buying, selling, and/or trading cryptographic tokens.

Figure 6:
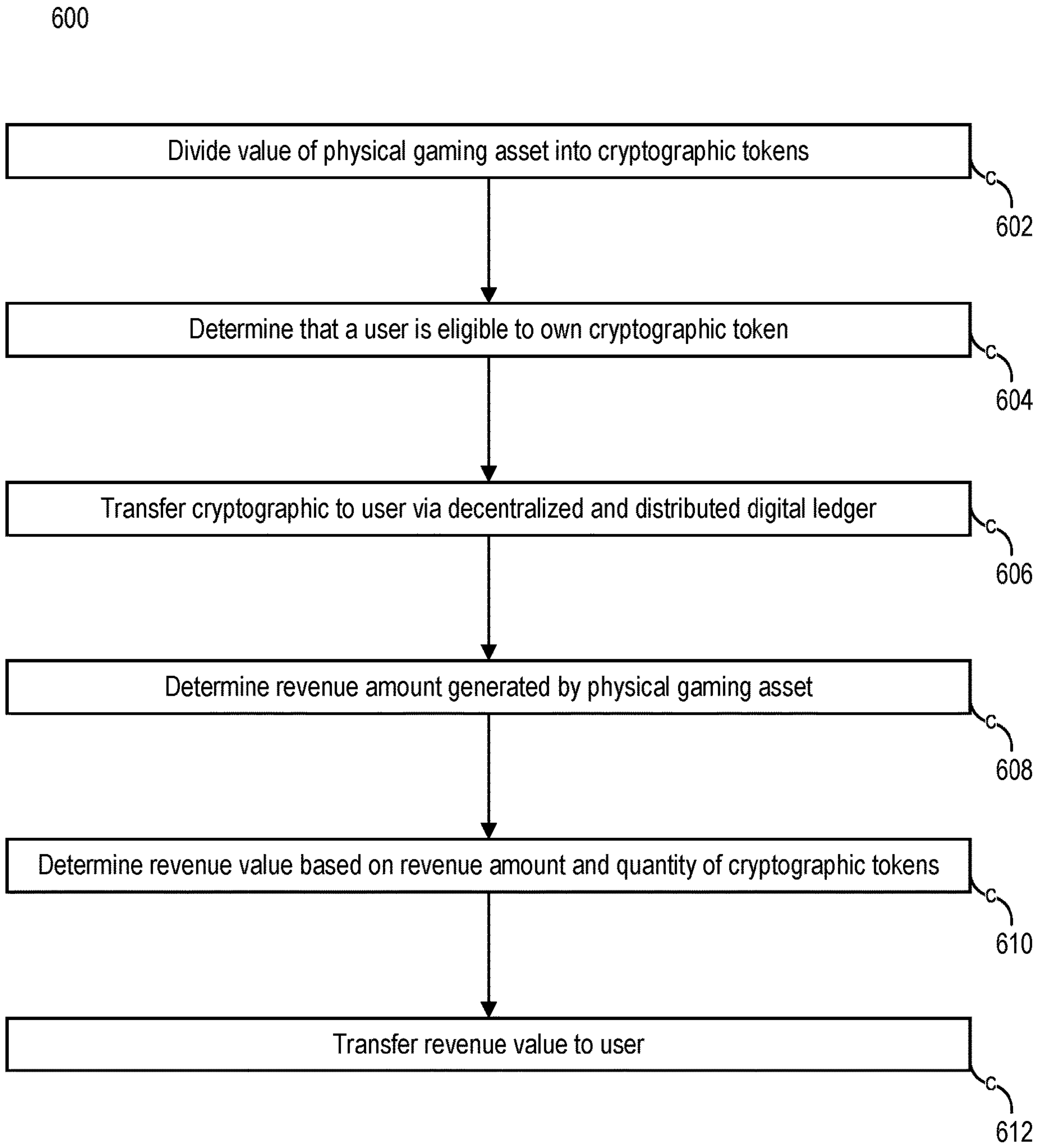
FIG. 6 is a flowchart illustrating operations of systems/devices/methods for providing wagering game tokenization of a physical wagering asset according to some embodiments.

Brief reference is now made to FIG. 6, which is a flowchart illustrating operations of systems/devices/methods for providing wagering game tokenization of a physical wagering asset according to some embodiments. Some embodiments include a gaming device comprising a processor circuit and a memory coupled to the processor circuit. The memory includes machine-readable instructions that, when executed by the processor circuit, cause the processor circuit to divide (block 602) a value of a physical gaming asset into multiple cryptographic tokens that each represent an ownership share of the physical gaming asset. The processor circuit is further caused to determine (block 604) that a user is eligible to own one of the cryptographic tokens and to transfer (block 606), for value, one of the cryptographic tokens to the user via a decentralized and distributed digital ledger that includes blocks. The processor circuit is further caused to automatically determine (block 608) a revenue amount that is generated by the physical gaming asset and to determine (block 610) a revenue value that corresponds to the revenue amount and a quantity of the of cryptographic tokens owned by the user. The processor circuit is further caused to transfer (block 612) the revenue value to the user.

Figure 7:
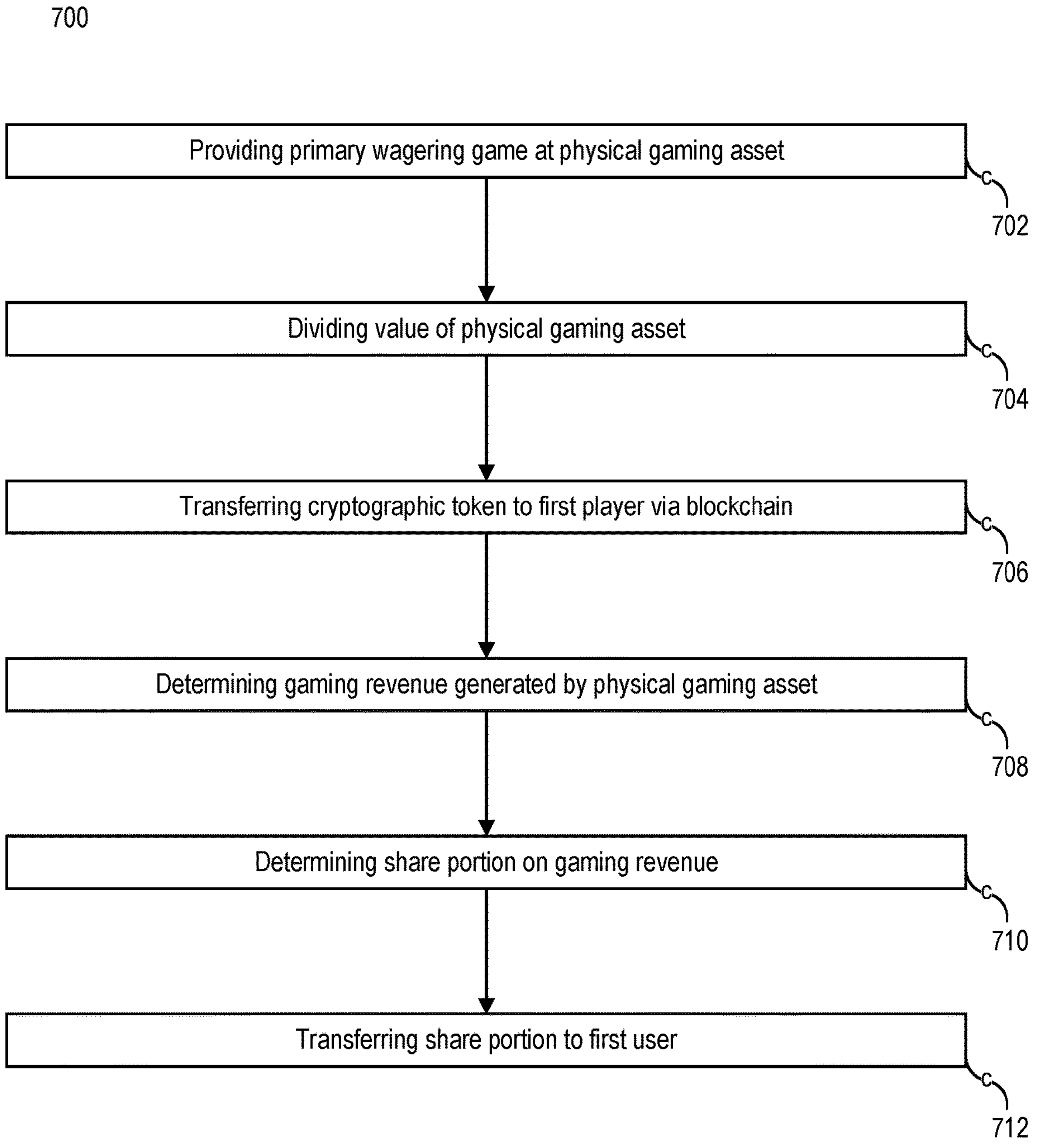
FIG. 7 is a flowchart illustrating operations of systems/devices for providing wagering game tokenization of a physical wagering asset according to some embodiments.

Brief reference is made to FIG. 7, which is a flowchart illustrating operations of systems/methods for providing wagering game tokenization of a physical wagering asset according to some embodiments. Methods may include providing (block 702), by a processor circuit, a primary wagering game at a physical gaming asset to a first player and dividing (block 704), by the processor circuit, a value of the physical gaming asset into multiple cryptographic tokens that each correspond to an ownership share of the physical gaming asset. Operations include transferring (block 706) one of the cryptographic tokens to the first player via a blockchain and determining (block 708) gaming revenue that is generated by the physical gaming asset. Operations may include determining (block 710) a share portion of the gaming revenue based on a quantity of cryptographic tokens and the shared portion of the gaming revenue and automatically transferring (block 712) the share portion of the gaming revenue to the first user.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory coupled to the processor circuit, the memory comprising machine-readable instructions that, when executed by the processor circuit, cause the processor circuit to:

divide a value of a physical gaming asset into a plurality of cryptographic tokens that represent an ownership share of the physical gaming asset, wherein each of the plurality of cryptographic tokens comprises game identification data, a collision-free signature of entry created using a hashing function associated with a common blockchain, and transaction data comprising sending addresses and receiving addresses for a plurality of unique transactions;

determine a winning game event of a wagering game provided by a gaming device associated with a first player, wherein the wagering game corresponds to the game identification data of a first cryptographic token of the plurality of cryptographic tokens;

in response to the winning game event, transfer ownership of the first cryptographic token to the first player against the common blockchain by updating the transaction data of the first cryptographic token;

securely authenticate the first cryptographic token against the common blockchain based on the collision-free signature of entry of the first cryptographic token; and in response to securely authenticating the first cryptographic token, transfer revenue value that corresponds to revenue that is generated by the physical gaming asset and the first cryptographic token.

2. The system of claim 1, wherein the physical gaming asset comprises an electronic gaming machine (EGM).

3. The system of claim 1, wherein the physical gaming asset comprises a single instance of a specific physical gaming asset.

4. The system of claim 1, wherein the physical gaming asset comprises a plurality of instances of a same physical gaming asset, wherein ones of the plurality of instances are in different casinos.

5. The system of claim 1, wherein the physical gaming asset comprises a plurality of different EGMs.

6. The system of claim 1, wherein the physical gaming asset comprises an online gaming system.

7. The system of claim 1, wherein the physical gaming asset comprises a lottery game.

8. The system of claim 1, wherein transferring ownership of the first cryptographic token to the first player comprises dividing the first cryptographic token into a fractional cryptographic token that corresponds to less than a full ownership share of one of the plurality of cryptographic tokens.

9. The system of claim 1, wherein the plurality of cryptographic tokens comprises: a first portion of first cryptographic tokens having a first value, a second portion of second cryptographic tokens having a second value and a third portion of third cryptographic tokens having a third value, wherein the first value is greater than the second value and the third value, and wherein the second value is greater than the third value.

10. The system of claim 9, wherein transferring ownership of the first cryptographic token to the first player comprises transferring ownership of one of the first portion of cryptographic tokens to the first player in response to receiving ownership of one of the second portion of cryptographic tokens or the third portion of cryptographic tokens and a non-cryptographic value.

11. The system of claim 9, wherein transferring ownership of the first cryptographic token to the first player comprises transferring ownership of the first cryptographic token to the first player in response to receiving ownership of one of the second portion of cryptographic tokens or the third portion of cryptographic tokens and based on game play characteristic of the first player.

12. The system of claim 1, wherein the processor circuit is further caused to provide a token exchange that manages transactions of cryptographic tokens, wherein the value of the physical gaming asset is based on a demand for the physical gaming asset.

13. The system of claim 1, wherein an eligibility of the first player to buy the one of the plurality of cryptographic tokens is based on a player interaction with the physical gaming asset.

14. The system of claim 13, wherein the player interaction with the physical gaming asset comprises a wager amount of the first player on the physical gaming asset.

15. The system of claim 13, wherein the player interaction with the physical gaming asset comprises earned bonuses during a wagering session.

16. The system of claim 1, wherein the plurality of cryptographic tokens comprises a first portion of first cryptographic tokens that correspond to a primary game at the physical gaming asset and a second portion of second cryptographic tokens that correspond to a secondary game at the physical gaming asset that is different from the primary game, wherein the first portion of cryptographic tokens are available to the first player based on primary game performance, wherein the second portion of cryptographic tokens are available to the first player based on secondary game performance, and wherein the secondary game comprises a bonus game.

17. The system of claim 1, wherein the processor circuit is further caused to use the common blockchain to perform ownership activities that comprise buying, selling, and trading cryptographic tokens.

18. A gaming device comprising:

a processor circuit; and a memory coupled to the processor circuit, the memory comprising machine-readable instructions that, when executed by the processor circuit, cause the processor circuit to:

divide a value of a physical gaming asset into a plurality of cryptographic tokens that each represent an ownership share of the physical gaming asset, wherein each of the plurality of cryptographic tokens comprises game identification data, a collision-free signature of entry created using a hashing function and associated with a common blockchain, and transaction data comprising sending addresses and receiving addressed for a plurality of unique transactions;

determine that a user is eligible to own a first cryptographic token of the plurality of cryptographic tokens based on a winning game event of a wagering game provided by the gaming device, wherein the wagering game corresponds to the game identification data of a first cryptographic token of the plurality of cryptographic tokens;

in response to the winning game event, transfer, the first cryptographic token to the user against the common blockchain by updating the transaction data of the first cryptographic token;

automatically determine a revenue amount that is generated by the physical gaming asset;

determine a revenue value that corresponds to the revenue amount and a quantity of the plurality of cryptographic tokens owned by the user;

securely authenticate the first cryptographic token against the common blockchain based on the collision-free signature of entry of the first cryptographic token; and in response to securely authenticating the first cryptographic token, transfer the revenue value to the user.

19. The device of claim 18, wherein the decentralized and distributed digital ledger comprises the common blockchain that comprises a block corresponding to a first cryptographic token and a second cryptographic token that corresponds to a portfolio of cryptographic tokens that correspond to first and second physical gaming assets.

20. A method comprising:

providing, by a processor circuit, a primary wagering game at a physical gaming asset to a first player;

dividing, by the processor circuit, a value of the physical gaming asset, into a plurality of cryptographic tokens that each correspond to an ownership share of the physical gaming asset, wherein each of the plurality of cryptographic tokens comprises game identification data, a collision-free signature of entry created using a hashing function and associated with a common blockchain, and transaction data comprising sending addresses and receiving addressed for a plurality of unique transactions;

determining a winning game event of the primary wagering game associated with the first player, wherein the wagering game corresponds to the game identification data of a first cryptographic token of the plurality of cryptographic token;

in response to the winning game event, transferring the first cryptographic token to the first player via the common blockchain by updating the transaction data of the first cryptographic token;

determining gaming revenue that is generated by the physical gaming asset;

determining a share portion of the gaming revenue based on a quantity of cryptographic tokens and the shared portion of the gaming revenue;

securely authenticating the first cryptographic token against the common blockchain based on the collision-free signature of entry of the first cryptographic token; and in response to securely authenticating the first cryptographic token, automatically transferring the share portion of the gaming revenue to the first player.

* * * * *